United States Patent Office 3,546,757
Patented Dec. 15, 1970

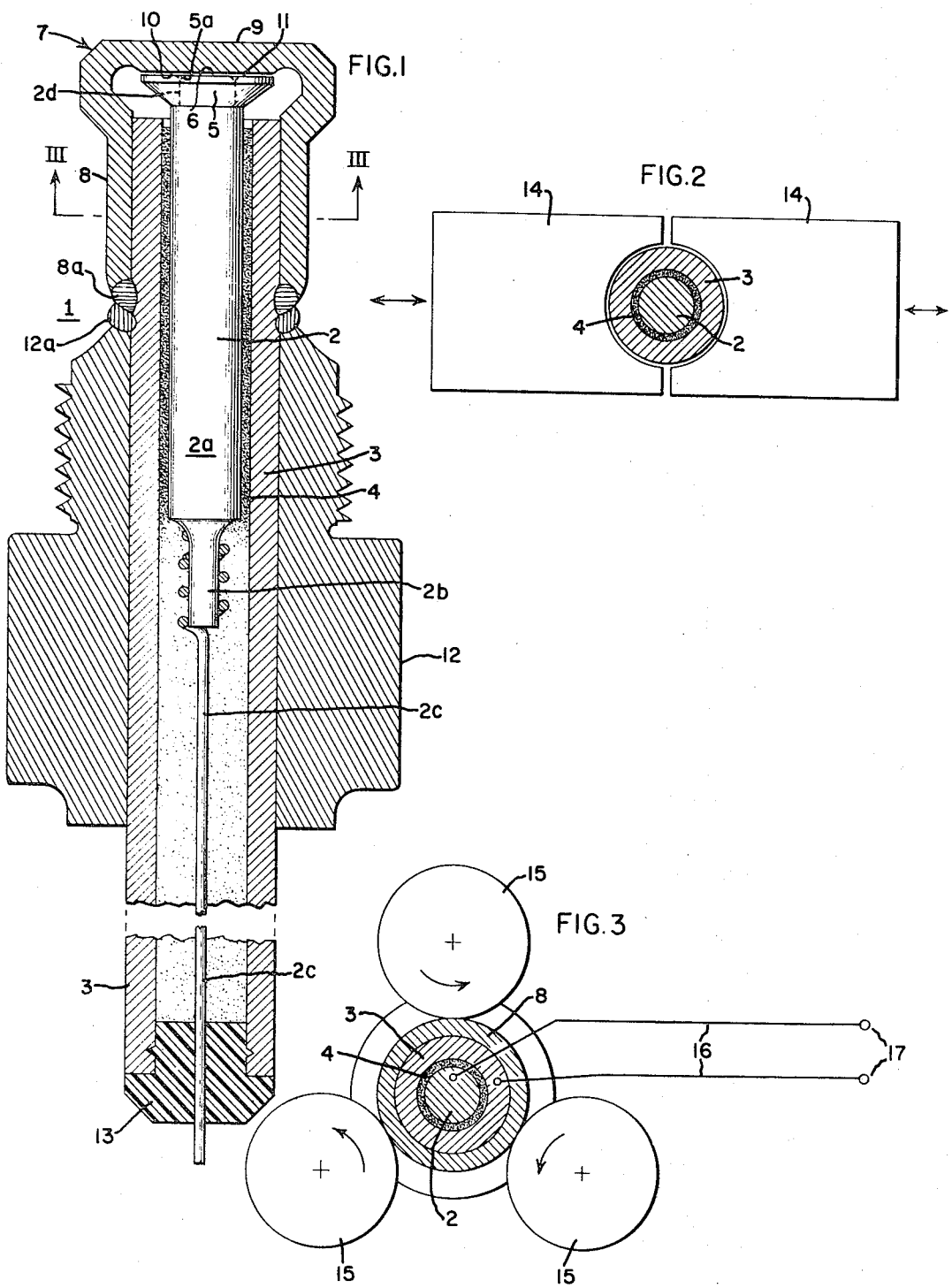

3,546,757
METHOD OF MANUFACTURING A VARIABLE CAPACITANCE TRANSDUCER
Leo Hoogenboom, Scotia, N.Y., assignor to General Electric Company, a corporation of New York
Original application Dec. 1, 1965, Ser. No. 510,894, now Patent No. 3,381,190, dated Apr. 30, 1968. Divided and this application Feb. 26, 1968, Ser. No. 740,417
Int. Cl. G01r 4/00
U.S. Cl. 29—25.41          1 Claim

ABSTRACT OF THE DISCLOSURE

Method of making a variable capacitance transducer with a capacitive air gap by deforming the exterior surface of the transducer to adjust the capacitive clearance inside the transducer.

---

This is a division of application Ser. No. 510,894, filed Dec. 1, 1965.

This invention relates to improved variable capacitance pressure transducers and their method of manufacture. More particularly, the invention relates to dynamic capacitance transducers suitable for measuring pressure variations in a high temperature environment such as a steam turbine chest and also pertains to improved manufacturing process for setting and maintaining the desired air gap in such a transducer.

Variable capacitance transducers are known wherein a conductive diaphragm exposed to a variable force, such as due to fluid pressure, will deform and change the air gap with another conducting member, where the two members act as plates of a capacitor. When attempting to design transducers capable of measuring very high pressures in a high temperature environment, the portions of the transducer which are intended to undergo elastic deformation must be very stiff and the clearances must therefore be very small in order to derive adequate capacitance change from the small movements. These very close clearances must be properly set inside the transducer which has already been sealed up to resist the pressure and the high temperatures. Also the materials of the transducer, particularly the insulating portions, must resist high temperature and permit the clearances to be adjusted without damage.

Accordingly, one object of the present invention is to provide an improved variable capacitance force-measuring transducer suitable for high pressure, high temperature environments.

Another object of the invention is to provide an improved method for setting clearances between the capacitive plates after the transducer has been sealed.

Still another object of the invention is to provide an improved transducer for measuring pressure variations in steam turbine nozzle chests.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is an elevation view, partly in cross section, of the pressure transducer in its preferred form, FIG. 2 is a schematic view, taken transversely through a partially completed transducer, illustrating the method of manufacture, and FIG. 3 is a schematic view, in transverse cross section, taken along lines III—III, illustrating the final steps in manufacturing the transducer.

Generally stated, the invention is practiced by employing coaxial cylindrical conductive members separated by powdered ceramic insulating material in compacted form, and a cap attached to the outer cylindrical member having a flat diaphragm portion forming close clearances with a flat disk portion attached to the inner cylindrical member. Clearances are set after the assembly is sealed by means of rolling the sleeve portion of the cap so as to increase its length and thereby set the internal clearance.

Referring now to FIG. 1 of the drawing, the transducer, shown generally as 1, comprises an inner cylindrical member 2 of conductive material consisting of a solid cylindrical portion 2a and a reduced diameter portion 2b. An electrical lead 2c is attached thereto by coiling around the reduced diameter portion 2b and spot-welding. Coaxial with the inner cylindrical member 2 and radially spaced therefrom is an outer cylindrical member 3, also of conductive material. Disposed between cylindrical members 2 and 3 is compacted form, as will be explained, is a quantity of powdered ceramic insulating material 4. Crushed alumina of high purity is a suitable substance for the powdered ceramic material, although other similar materials are also satisfactory.

Attached to one end of the inner cylindrical member 2 by a circumferential weld indicated at 5a is a disk member 5 having an accurately machined flat surface 6. The disk 5 serves as one plate of the capacitor.

Disposed around the end of the outer cylindrical member 3 is a cap shown generally as 7. Cap 7 comprises a sleeve portion 8 fitting over cylindrical member 3 with a slight interference fit and is closed off at one end by a transverse diaphragm portion 9, and the other end is welded with weld 8a to member 3. Preferably, the cap 7 is one integral piece and the walls of sleeve 8 and diaphragm 9 are of approximately the same thickness. The diaphragm portion 9 has an accurately machined interior surface 10 which forms the other plate of the capacitor. Flat surfaces 6, 10 are separated from one another by a very tiny uniform air gap 11.

All of the conducting members of the assembly thus far described, i.e., cap 7, inner cylinder 2, outer cylinder 3, are preferably of a temperature resisting alloy such as Inconel 600, manufactured by International Nickel Company.

The transducer assembly is held in place by means of a threaded fitting 12 which is welded to cylinder 3 with weld 12a which provides a seal against the escape of the fluid of which the pressure is measured and so as to provide adequate support for the transducer. Obviously, fitting 12 could take many equivalent forms. A suitable resin potting compound 13 is employed in the end of cylinder 3 to close off the end of the cylinder 3 and support the lead 2c in an insulating manner. The operating temperature of the compound 13 is under 250° F. so adequate length of cylinder 3 is provided to permit high temperature operation of the sensing element.

In operation, the fitting 12 is screwed into place and the pressurized fluid surrounding the cap 7 causes the diaphragm portion 9 to deform elastically and vary the air gap 11. The ends of lead 2c and cylinder 3 are connected to a commercially obtainable capacitive displacement meter such as Type CVM3A or CVM5 made by Technisch Bureau J. Th. van Reysen, Delft, Holland, which is calibrated to display pressure fluctuations.

Although diaphragm type air dielectric capacitive transducers with relatively large air gaps are known, the method of manufacture hereinafter described enables very accurate control of small clearances in air gap 11. The steps of manufacture comprise first placing cylindrical member 2 with attached lead 2c which is strung with crushable ceramic beads inside cylinder 3 and, while they are held coaxially spaced from one another, filling the open space with refractory dielectric using powdered alumina. Both ends are temporarily plugged and the assembly is swaged to obtain a dense hard packing of the ceramic material, especially around the solid portion 2a of the inner cylinder. The swaging process is illustrated in FIG. 2 wherein swaging blocks 14 are alternately closed together around the outer cylinder as the blocks or the assembled parts are rotated.

Next, the cylinder 3 is opened at either end and the end of inner cylinder 2 is exposed. The extremity of cylinder 2 is machined to provide a round extension 2d. The flat disk portion 5 is welded to the extension 2 with a circumferential fusion weld 2a and the disk is machined and lapped perpendicular to the axis of the cylinder 3.

Next, the cap 7 is slid with a slight interference fit over the outer diameter of cylinder 3 so that surfaces 6 and 10 come uniformly in contact with one another. The free end of sleeve portion 8 is welded to cylinder 3 with weld 8a. Also the fitting 12 or any other suitable supporting member may be attached to the cylinder 3 with weld 12a.

The last step in the manufacture consists of setting the gap 11. This is illustrated in FIG. 3 of the drawing wherein rollers 15 are rotated and advanced axially to indent the outer surface of sleeve portion 8 and thereby stretch the sleeve a very slight amount with each rolling. Exterior leads 16 are provided and connected to the inner and outer cylinders 2, 3 so that they are also electrically connected with the capacitive plate members 5 and 9. A pair of terminals 17 are first connected to an ohmeter and sleeve 8 is rolled until the indicated resistance sharply increases, indicating a separation of surfaces 6, 10. Next, a capacitance meter similar to the one previously described is connected to terminals 17 and the rolling progresses until the desired air gap is achieved. The stretch with each rolling is on the order of 0.001 inch. The stretch per revolution of the rollers is in the order of 1–10 microinches.

In order to stabilize the gap, the assembly is then annealed at a temperature well above the intended operating temperature of the transducer in order to relieve stresses. The rolling operation is repeated and then the assembly is again annealed. Two or three cycles are all that are required to stabilize the gap 11.

As an example of a pressure transducer suitable for measuring pressure variations in a steam atmosphere on the order of 3500 p.s.i. and 1050° F., the air gap is set between 0.0004″ and 0.0006″ by the aforementioned process. At the operating temperature and pressure, then, when diaphragm 9 deforms inwardly, the gap is on the order of 0.0001″ to 0.00002″. Dynamic pressure variations on the order of $\frac{1}{10}$ of a p.s.i. can be measured with the aforesaid transducer at a pressure level of 3500 p.s.i.

The described assembly method allows precise setting of the capacitive air gap inside the transducer after it has been sealed up and insures a uniform gap. By following the procedure of initially causing the plates to contact one another and then causing them to separate, an extremely precise and uniform gap is achieved.

Concentricity of the members is maintained by the powdered ceramic which nevertheless allows setting of the gap to take place during the rolling operations without damage. The ceramic material also withstands the high temperatures.

While there has been described what is considered to be the preferred embodiment of the invention, other modifications may occur to those skilled in the art, and it is desired to cover in the appended claim all such modifications as fall within the true spirit and scope of the invention.

What I claim as new and desire to secure by Letters Patent of the United States is:

1. A process for manufacturing a variable capacitance transducer comprising the steps of:
   providing inner and outer coaxial cylindrical members uniformly spaced from one another,
   filling said space with powdered ceramic insulating material,
   swaging the outer cylinder to compact said insulating material,
   attaching a flat disk portion to the end of the inner cylindrical member,
   providing a cap member having a sleeve portion and a transverse flat diaphragm portion,
   sliding said cap member over the outer cylindrical member until the diaphragm portion contacts the disk portion and sealingly attaching the sleeve portion to the outer cylindrical member,
   and opening a capacitive clearance between the disk portion and the diaphragm portion by rolling the sleeve portion of said cap member so as to incrementally and controllably stretch the sleeve portion.

References Cited
UNITED STATES PATENTS
3,418,546   12/1968   Beavers et al. _____ 317—246

JOHN F. CAMPBELL, Primary Examiner

R. W. CHURCH, Assistant Examiner

U.S. Cl. X.R.

29—593, 603, 511, 516